United States Patent [19]

Victor et al.

[11] Patent Number: 4,920,260

[45] Date of Patent: Apr. 24, 1990

[54] DETECTOR SYSTEM FOR OPTICAL MOUSE

[75] Inventors: Kenneth E. Victor, Mountain View; Carl A. Goy, Fremont, both of Calif.

[73] Assignee: MSC Technologies, Inc., Fremont, Calif.

[21] Appl. No.: 238,716

[22] Filed: Aug. 30, 1988

[51] Int. Cl.⁵ .............................................. G01V 9/04
[52] U.S. Cl. .................................... 250/221; 340/710
[58] Field of Search ............... 250/221, 237 G, 237 R; 340/710; 235/472

[56] References Cited

U.S. PATENT DOCUMENTS

| | | | |
|---|---|---|---|
| 4,364,035 | 12/1982 | Kirsch | 340/710 |
| 4,409,479 | 10/1983 | Sprague et al. | 250/237 |
| 4,546,347 | 10/1985 | Kirsch | 340/710 |
| 4,751,380 | 6/1988 | Victor et al. | 250/221 |

FOREIGN PATENT DOCUMENTS 54-126426 10/1979 Japan .

Primary Examiner—Léon Scott, Jr.

[57] ABSTRACT

An improved detector system for an optical mouse including an optical mouse housing for supporting a four-by-four array of detector elements, a light source, and a light directing mirror. The light source may be visual, ultraviolet or infrared. The optical detector elements of the array are labeled A through P starting with row 1, column 1 and going left to right. Each element is about one-quarter of a grid period square and capable of producing an electrical output signal corresponding to the amount of light it receives. The elements are grouped into pairs of elements which are located so as to image areas on the grid pattern a distance of an odd multiple of grid periods apart in a direction which is orthogonal to the direction of motion which they detect. Pairs A+C, E+G, I+K, and M+O detect vertical motion and pairs A+I, B+J, C+K, and D+L detect horizontal motion. Paired output signals measuring motion along the same axis are 90 degrees out of phase if adjacent to one another, and 180 degrees out-of-phase if an odd multiple of grid periods apart. Detector movement and position is determined by comparting output signals measuring motion in the same direction which are 180 degrees out-of-phase with one another. At points where the compared output signals cross, a grid line or space is detected. Each crossing point indicates a state change. By combining and comparing output signals from each of the eight pairs of elements, four square wave quadrature signals indicating motion in either the x or y-axis direction can be produced. The quadrature signal for a particular direction of movement that leads in time the other quadrature signal representing motion along the axis is indicative of the direction of movement of the optical mouse.

23 Claims, 7 Drawing Sheets

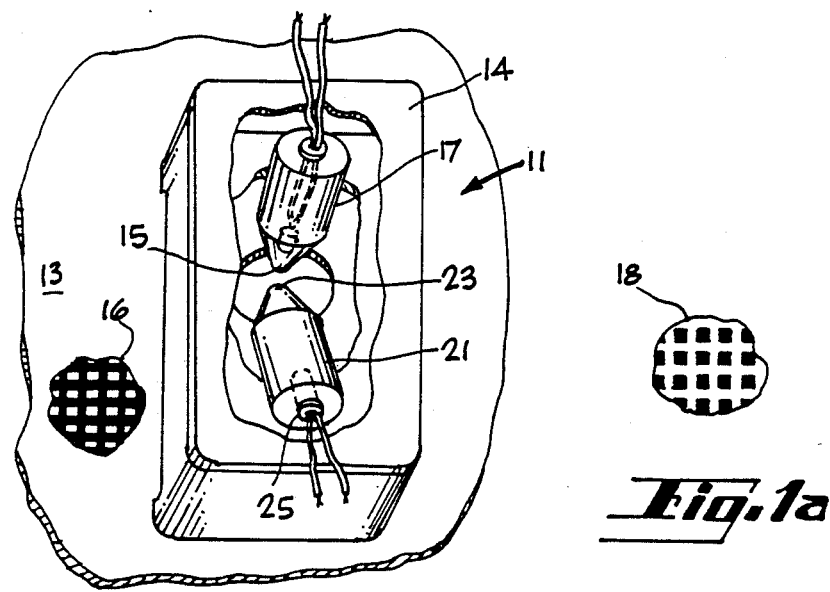
Fig.1a
Fig.1
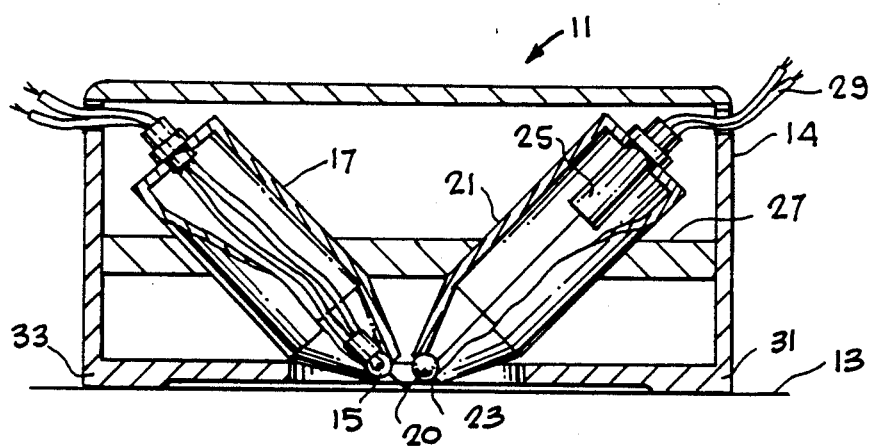
Fig.2

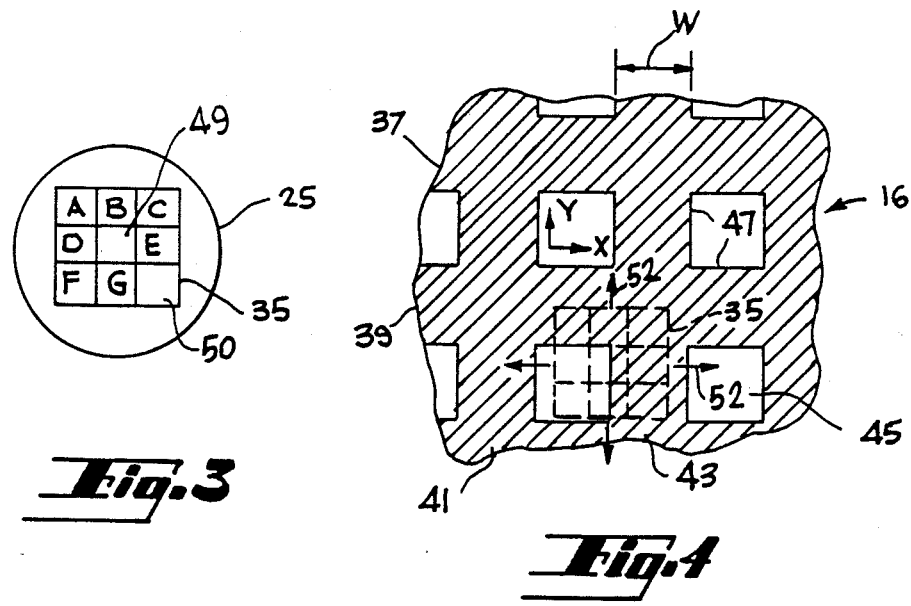
Fig.3
Fig.4
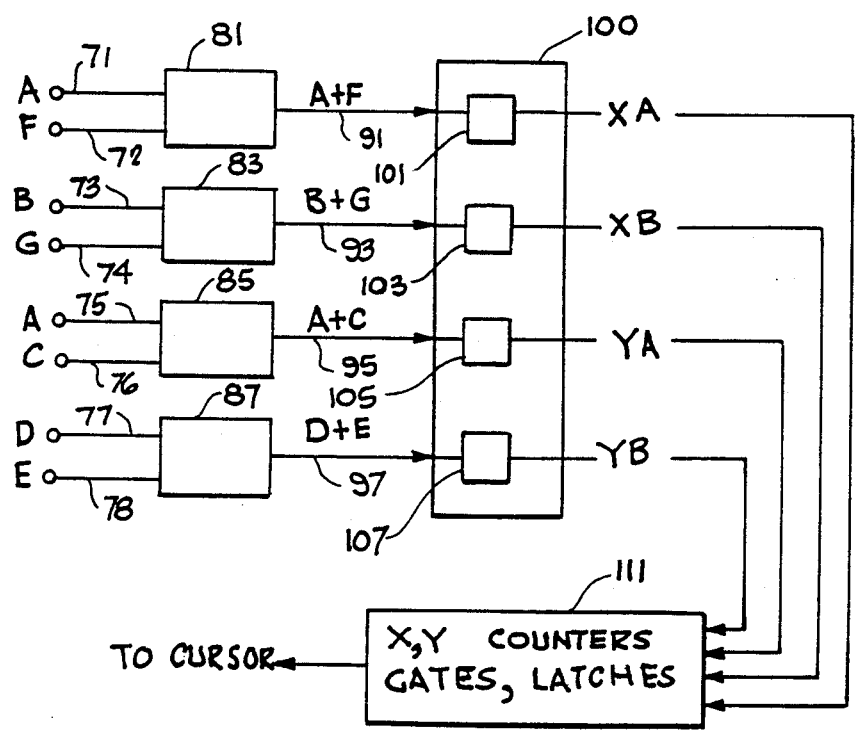
Fig.5

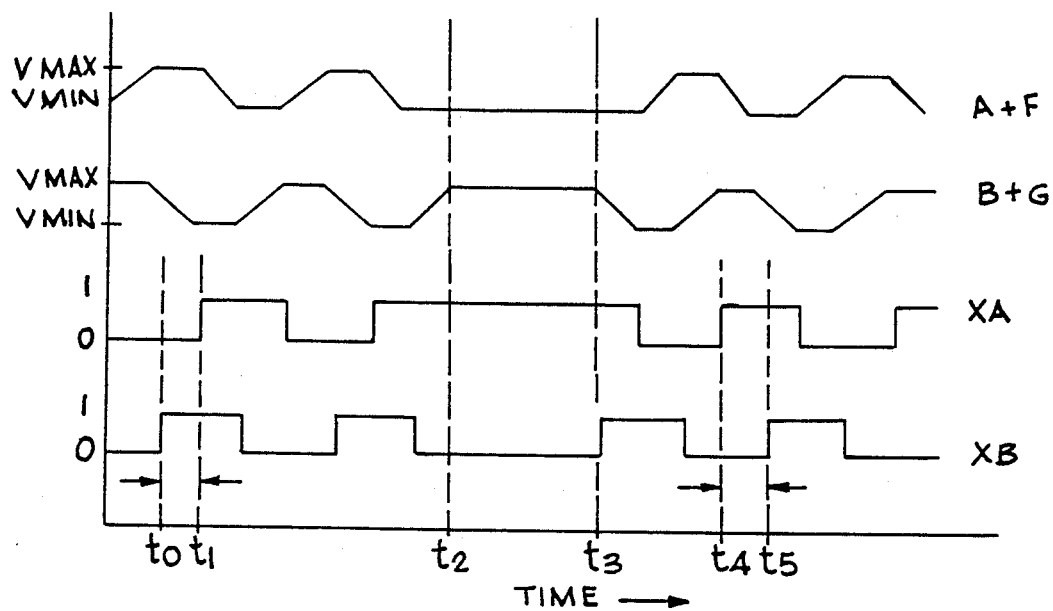
Fig. 6
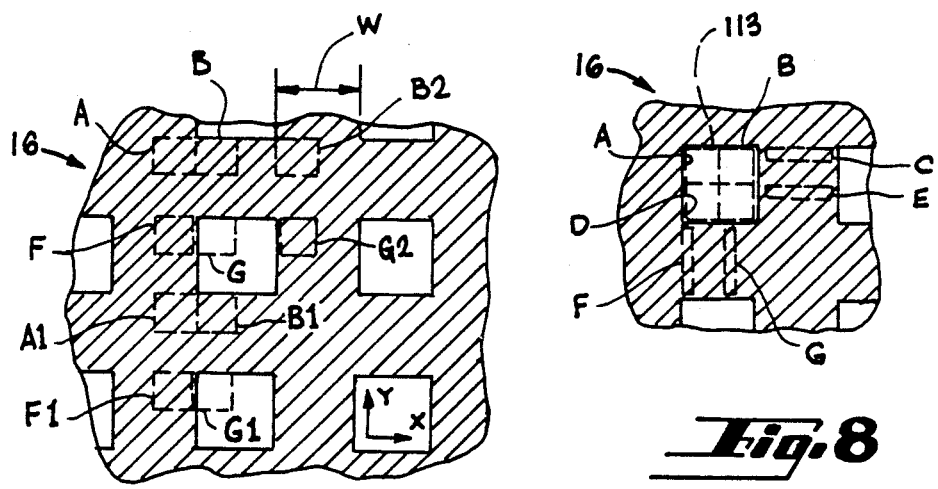
Fig. 7
Fig. 8

DETECTOR SYSTEM FOR OPTICAL MOUSE

BACKGROUND OF THE INVENTION

1. Field of the Invention

The present invention relates generally to an optical mouse or cursor control device in which movement of the device over a passive grid surface controls the placement of a pointer in the memory of a system or the movement of a cursor on a visual display system, such as a computer screen. In particular, the invention relates to an improved optical detector system for an optical mouse which does not require differentiating circuits to determine state changes indicative of detector position.

2. Reference to Related Application

This application is related to U.S. Pat. No. 4,751,380, issued June 14, 1988.

BRIEF DESCRIPTION OF THE PRIOR ART

Optical mice capable of detecting their position over a passive multicolored grid are known. As used herein, the term "mouse," or its plural "mice," is used to describe any type of mechanical or optical device capable of detecting its relative motion and/or position over a surface and producing an output signal proportional to its motion and/or position that can be used to determine the position of a cursor on a computer screen or a pointer in a computer memory.

In U.S. Pat. No. 4,409,479, Sprague et al. describe an optical mouse which moves over a grid of horizontal and vertical lines of one color with spaces between the grid lines of another color. The distance from the center of one space to the center of an adjacent grid on either the horizontal or vertical axis is one grid period. The optical detector comprises four sensors, two sensors in each the horizontal and vertical direction. Each sensor has a radiation collection area that is not more than one-half of a grid period wide and at least one grid period long. The two sensors used in a particular direction are separated by one quarter of a grid period. Each sensor generates a quadrature signal indicative of the amount and direction of movement of the mouse, thus each pair of sensors generates a pair of related quadrature signals. The phase relationship between the pairs of signals indicates the direction of movement of the mouse.

In U.S. Pat. No. 4,546,347, Kirsch describes an electro-optical mouse having two linear arrays of detector elements at right angles to each other. The mouse moves over a surface marked with a grid of lines with three optical contrasting levels, including a separate contrast level for line intersections. One linear array images a line and a space in the horizontal direction, while the other array images a line and space in the vertical direction. Each array has four elements, adjacent elements being 90 degrees out-of-phase with each other. By pairing first and third elements and second and fourth elements of each array, then subtracting the output of these, line crossings may be observed with improved ability without the need for a compensating threshold voltage.

In U.S. Pat. No. 4,364,035, Kirsch describes an electro-optical mouse which moves over a surface marked with a two color grid of lines. The mouse has a dual color light source which rapidly and continuously switches from one color to the other. The mouse also has a four-quadrant light detector positioned for receiving the light reflected from the grid. During illumination by light of one color the detector can distinguish lines only of the opposite color. Hence, as the mouse crosses lines of different color, the detectors sense changes in contrast and generate electrical signals representing the line crossings. The desired output from the detectors is taken from three of the four elements, two horizontal bits from two horizontal elements and two vertical bits from two vertical elements. By clocking emission of the two colors and the detector output signal, a position signal for a cursor may be derived.

In cursor position control systems using an optical mouse moving over a grid, it is desirable that the mouse components be sufficiently compact so that the mouse fits in the palm of a hand. The system should be able to reliably determine motion of a mouse over a grid surface for every possible relative position between the detector elements and the grid lines. Further, it is desirable that the system not be strongly dependent on the absolute reflectivity of the particular grid or on the amount of contrast between reflective and non-reflective portions of the grid, so that compensation with a threshold voltage is not required.

LIST OF OBJECTIVES

It is therefore a primary objective of the present invention to provide an optical mouse capable of reliably determining its position over a grid surface for every possible relative position between the detector elements and the grid lines.

Another object of the present invention is to provide an optical mouse that is not strongly dependent on the absolute reflectivity of the particular grid or on the amount of contrast between reflective and non-reflective portions of the grid, so that compensation with a threshold voltage is not required.

A further object of the present invention is to provide an improved optical mouse which is capable of detecting grid line crossings without having to differentiate the rise or fall time of the output signals of each detector element.

A still further object of the present invention is to provide an improved optical mouse which is capable of being used with a single color, translucent grid.

These and other objects and advantages will no doubt become apparent to those skilled in the art after having read the following detailed description of the preferred embodiment which are contained in and illustrated by the various drawing figures.

SUMMARY OF THE PRESENT INVENTION

Some of the above objects have been met with a cursor position control system in which an optical mouse movable over a grid surface has a detector which is a three-by-three array of detector cells. The surface has a grid pattern thereon which is made up of two intersecting orthogonal sets of parallel grid lines and spaces defined between the grid lines. The grid lines are of a first color and the spaces are of a second contrasting color. The grid lines are uniformly spaced apart and of a uniform line width. The spaces have a width which is equal to the line width. The mouse has a light source which illuminates a portion of the surface and the detector is disposed to receive and detect the light reflected from the surface.

The detector cells image areas of the grid pattern which typically have a characteristic dimension which is substantially equal to one-half of the line width. Seven of the nine detector cells are used. The cells are grouped into pairs of cells which are located so as to image areas on the grid pattern a distance of an odd multiple of line widths apart in a direction which is orthogonal to the direction of motion which they detect. Thus, for example, a pair of cells for detecting vertical motion may be located for imaging areas one line width horizontally apart, thereby ensuring that one of the cells in the pair detects crossings of the mouse through spaces and horizontal grid lines.

Alternatively, a pair of cells for detecting vertical motion may be located for imaging areas on the grid which are spaced three, five, seven or some other odd number of line widths horizontally apart. Similarly, pairs of cells for detecting horizontal motion may be located for imaging areas one, three or other odd numbers of line widths vertically apart. There are two pairs of cells for detecting horizontal motion and two pairs of cells for detecting vertical motion. One pair of cells for detecting a particular direction of motion images areas that are located one-half line width apart, three-halves line widths apart, or other odd multiples of half line widths apart in the direction of motion from the areas imaged by other related pair of cells, thereby producing a distinguishable lead or lag in the detection by the pairs of cells or crossings over spaces and grid lines.

The detector cells produce an electrical output signal corresponding to the amount of light they receive. The signals from each of the four pairs of cells are combined and then converted to four quadrature signals of square waves. The quadrature signals switch to a first state when the combined signals are increasing with time and switch to the opposite state when the combined signals are decreasing with time, or vice versa, thereby avoiding threshold problems and the need for a reference voltage.

The remainder of the above objects have been met with an improved embodiment of the present invention which includes an optical mouse housing for supporting a four-by-four array of detector elements, a light source, and a light directing mirror. The light source may be visual, ultraviolet or infrared. The optical detector elements of the array are labeled A through P starting with row 1, column 1 and going left to right. Each element is one-fourth of a grid period square and is capable of producing an electrical output signal corresponding to the amount of light it receives. The elements are grouped into pairs of elements which are located so as to image areas on the grid pattern a distance of an odd multiple of grid periods apart in a direction which is orthogonal to the direction of motion which they detect. Pairs A+C, E+G, I+K, and M+O detect vertical motion and pairs A+I, B+J, C+K, and D+L detect horizontal motion. Paired output signals measuring motion along the same axis are 90 degrees out of phase, if adjacent to one another, and 180 degrees out-of-phase, if an odd multiple of grid periods apart. Detector movement and position is determined by comparing output signals measuring motion in the same direction which are 180 degrees out-of-phase with one another. At points where the compared output signals cross, a grid line or space is detected. Each crossing point indicates a state change. By combining and comparing output signals from each of the eight pairs of elements, four square wave quadrature signals indicating motion in either the x or y-axis direction can be produced. The quadrature signal for a particular direction of movement that leads the other signal in time is indicative of the direction of movement of the optical motion sensing device or "mouse".

BRIEF DESCRIPTION OF THE DRAWING

FIG. 1 is a perspective plan view of an optical mouse having a detector in accord with the present invention;

FIG. 1a is a plan view of an alternate grid pattern for use with the optical mouse of FIG. 1;

FIG. 2 is a side view of the apparatus shown in FIG. 1;

FIG. 3 is a plan view of the detector array for use in the optical mouse of FIGS. 1 and 2;

FIG. 4 is a plan view of a portion of a grid pattern for use with the optical mouse of FIG. 1 and indicating the relative size of the area observed by the detector array of FIG. 3 in relation to the grid pattern;

FIG. 5 is a schematic electrical diagram of a logic circuit used with the detector in FIG. 3;

FIG. 6 is a timing diagram representation of the quadrature signal outputs of two pairs of detector cells of FIG. 3, indicative of the amount and direction of movement along a particular orthogonal coordinate axis;

FIG. 7 is a plan view of a portion of a grid pattern for use with the optical mouse of FIGS. 1 and 2 illustrating the relative spacing of detector cells in relation to the grid pattern;

FIG. 8 is a plan view of a portion of a grid pattern indicating the relative sizes of areas observed by detector cells of an alternate detector in relation to the grid pattern;

DESCRIPTION OF THE PREFERRED EMBODIMENT

Figure 9:
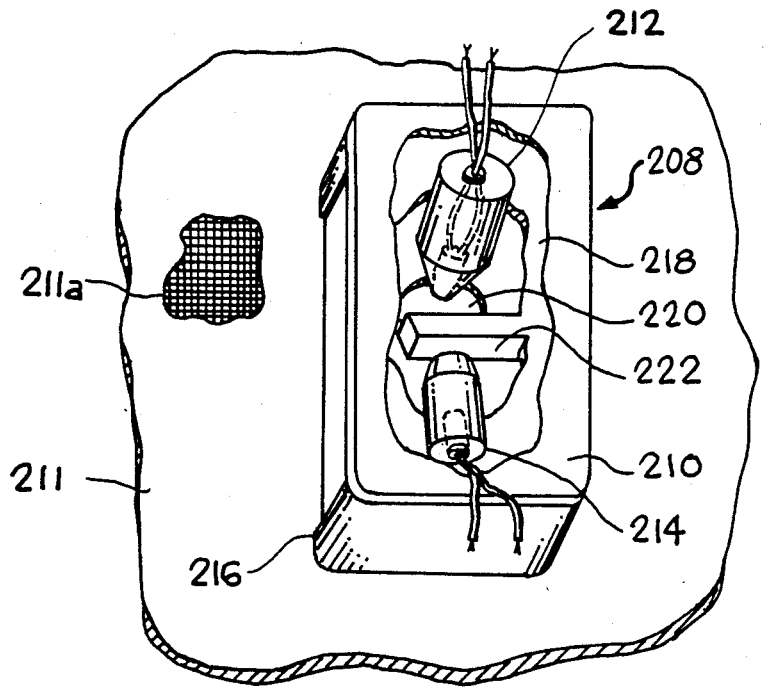
FIG. 9 is a perspective plan view of an optical mouse having a detector in accordance with the present invention.

With reference to FIGS. 1 and 2, an optical mouse 11 includes a housing 14, containing a light source 15 and a photodetector 25. The housing is gripped by a human hand and pushed in any direction on a surface 13, corresponding to the direction and extent to which it is desired to move a cursor or similar device on a visual display system, such as a computer screen. Housing 14 fits in the palm of a hand and has thin, low friction feet or spacers 31 and 33 which contact surface 13 and elevate the body of the housing a slight distance above surface 13. Spacers 31 and 33 may be made, for example, of Teflon or nylon so that the housing slides easily over the surface.

Source 15 may be a light emitting diode (LED), incandescent bulb or other broadband illumination source and may emit ultraviolet and infrared, as well as, visible light. Alternatively, source 15 may be a laser such as a diode laser. Source 15 is aimed downwardly at a spot 20 on surface 13. Source 15 may be mounted within a light tight supporting tube 17, as shown, or may be directly aimed at the surface. Supporting tube 17 extends angularly downward through a planar support 27 of housing 14 and is held in place therein. Preferably, source 15 is mounted close to the surface so that light arriving at the surface will be in a relatively narrow spot, with a diameter sufficient to illuminate the area viewed by detector 25. Typically, as for example with the detector in FIG. 3, the spot diameter is about 1.0 mm, sufficient to cover a grid line and space, or grid period, with a line width of about 0.5 mm.

Also mounted in housing 14 is a detector tube 21 having at its forward end an imaging lens 23. The remainder of the tube 21 is generally light tight. Tube 21 extends angularly downward through shelf 27 so as to receive light reflected from spot 20. Lens 23 directs light reflected from spot 20 onto detector 25. Detector 25 is mounted at the rear of tube 21 and receives a magnified image of a portion of surface 13 via the imaging lens 23. Typically, lens 23 is spaced more than one focal length from the surface. The spacing between detector 25 and lens 23 is about five focal lengths. The magnification that results should be such that the area being looked at by detector 25 images onto the detector. A low magnification, as low as is possible, is preferred so as to reduce optical errors. The diameter of lens 23 is approximately 3 to 8 mm, but could be more or less. If the light source 15 is sufficiently close to the surface, or is a laser, so that detector 25 does not detect light directly from source 15, tube 21 becomes unnecessary and may be omitted.

In FIG. 1, a partial grid pattern 16 may be seen on surface 13, with dark orthogonal lines and white spaces between the lines. Surface 13 has a horizontal and vertical repetitive pattern of passive, position related indicia which extend over at least a portion of the surface. Preferably, these indicia are marks of high optical contrast, such as an optically absorptive and reflective pattern. Such a pattern could be a shiny metallic, white or other highly reflective surface with a grid of black lines marked on the surface. The lines may be created by printing small dots or lines or other shapes with ink having pigment particles of the desired optical properties. Alternatively, black squares may be marked on the surface, resulting in the pattern 18 seen in FIG. 1a having reflective grid lines with low reflectivity spaces therebetween. The grid pattern is discussed further below in greater detail with reference to FIG. 4.

The cursor position control system of the present invention, which comprises optical mouse 11 and surface 13 with grid pattern 16, generates electrical signals which instruct a cursor regarding movement up or down, left or right. There is no particular starting place for the mouse on the surface and it may be brought down any place on the surface, so long as there is sufficient room to move the mouse in a direction wherein cursor motion is desired. When placing the mouse on the surface, alignment should be such that detector 25 is appropriately oriented with respect to the grid pattern on the surface, as shown in FIG. 4. However, the mouse may be rotated up to 45 degrees in either direction from this nominal orientation without affecting the decoded signal. The typical size for housing 14 of mouse 11 is approximately 6 cm in width and approximately 8 cm in length. A preferred size for the surface would be approximately 22 cm in width and approximately 30 cm in length. These dimensions are not critical and the housing or surface may be larger or smaller as needed.

In FIG. 3, the active area of detector 25 is represented by the square 35. Detector 25 is a three-by-three array of detector cells. The cells may be transistors or diodes of a CCD array. Seven of the nine detector cells, designated by the letters A, B, C, D, E, F and G, are active while the two remaining cells 49 and 50 are unused. Cells A, B, F and G are used for determining horizontal motion and cells A, C, D and E are used for determining vertical motion. The manner in which this determination is made is discussed below with reference to FIGS. 5 and 6.

FIG. 4 shows a portion of the grid pattern 16 on surface 13. Grid pattern 16 is made up of two intersecting orthogonal sets of grid lines, including a set of horizontal grid lines, such as lines 37 and 39, and a set of vertical grid lines, such as lines 41 and 43, and is also made up of spaces 45 defined between the grid lines. Grid lines are of a first color, while spaces are of a second contrasting color. Thus, grid lines may be reflective or white and spaces may be absorptive or black, or vice versa. The boundaries 47 between grid lines and spaces need not be sharply defined, although this is preferred, provided a sufficient contrast ratio exists between lines and spaces so as to be detectable. In producing the grid pattern, the entire surface 13 may start as a reflective area. Glossy white paper or mylar may be used. Colored inks or dyes may then be used to print the lines.

Typically, the vertical grid lines 41 and 43 and the horizontal grid lines 37 and 39 have approximately the same line width, W. Each set of grid lines is made up of parallel uniformly spaced grid lines. The spaces 45 are of uniform size with a width approximately equal to the line width. Typically, the line width, W, is about 0.5 mm for both vertical and horizontal grid lines, forming square spaces 0.5 mm on a side. 1.0 mm or other line widths may also be used. The pattern need not form square spaces, although square spaces are easier to handle for computation purposes.

In FIG. 4, the dashed line 35 indicates the relative area within a grid which forms the field of view and orientation of the array detector 25 illustrated in FIG. 3, relative to the grid of lines and in particular to the line width. The dashed line 35 represents the area imaged by the lens of the detector tube onto the detector array, such that each detector cell is capable of resolving one-half the width of a grid line or space.

The optical mouse is moved in any direction relative to grid pattern 16. This is represented in FIG. 4 by arrows 52 in which the field of view of the detector within dashed square 35 may move up or down and left or right. Since the grid lines are orthogonal, as indicated in FIG. 4 by the x-y coordinate axes, horizontal motion in the x-direction and vertical in the y-direction are detected and measured independently. If the mouse is rotated more than 45 degrees, the axes switch (i.e., the horizontal cells sense vertical motion, and vice versa).

For horizontal motion, detector cells A and F are located so as to image areas which are one line width vertically apart. This ensures that while one cell follows a horizontal grid line, such as line 39, the other cell is away from a horizontal grid line and detects crossings through vertical grid lines and spaces. Likewise, detector cells B and G are located so as to image areas which are one line width vertically apart. The pair of cells A and F are located so as to image areas one-half of a line width horizontally apart from areas imaged by a related pair of cells B and G. This separation produces a lead or lag in the detection of line crossings by one pair relative to the other related pair so that direction of motion may be determined.

For vertical motion, detector cells A and C are located so as to image areas one line width horizontally apart. Detector cells D and E are also located so as to image areas one line width horizontally apart. The pair of cells A and C are located so as to image areas one-half of a line width vertically apart from areas imaged by the pair of cells D and E. The result is that for each pair, while one cell follows a vertical grid line, the other cell of the pair detects crossings through horizontal grid lines and spaces. One pair leads the other related pair in the detection of line crossings relative to the other pair.

In FIG. 4, detector cells of a pair of cells for detecting motion of the mouse in a particular direction image areas of the grid pattern which are separated in a direction orthogonal to that particular direction by a distance of one line width, W, thereby ensuring that one cell in the pair detects crossings through grid lines and spaces. However, as seen in FIG. 7, there are also other cell separations which obtain this result. A pair of detector cells A and F are located so as to detect horizontal motion, and, as in FIG. 4, image areas one line width apart. Cells A and A1 image areas two line widths apart. During horizontal motion, cells A and A1 either both detect crossings through vertical grid lines and spaces or both follow horizontal grid lines. In the later case, neither cell A nor cell A1 detects horizontal motion. Accordingly, cells A and A1 and other pairs of cells which image areas separated by an even number line widths, W, are not suited for detecting mouse movement. Cells A and F1 image areas which are three line widths apart. As with cells A and F, one cell in the pair A and F1 is always located for detecting crossings through grid lines and spaces. This is also true for any cell pairs which image areas separated by other odd multiples of line widths W. In FIG. 7, pairs of cells B and G, B and G1, and B2 and G2 also image areas an odd number of vertical line widths apart, and can detect horizontal mouse motion over the grid. The case for vertical motion detection is analogous.

Also in FIG. 4, each pair of cells, for detecting motion of the mouse in a particular direction, image areas of the grid pattern which are separated in that particular direction from areas imaged by a related pair, for detecting motion in the same direction, by one-half of a line width, thereby producing a recognizable lead or lag in the detection of line crossings by one pair relative to the other related pair. However, as seen in FIG. 7, there are also other pair separations which obtain this lead or lag. The pair of cells A and F image areas one-half line width apart from the pair of cells B and G. During rightward motion of the mouse, pair B and G leads pair A and F by a 90 degree phase separation in the detection of line crossings. During leftward motion, pair B and G lags pair A and F by 90 degrees. Accordingly, there is a recognizable difference between leftward and rightward motion, enabling the detector system to determine the direction of motion of the mouse. The pair of cells A and F image areas three-halves line widths apart from the pair of cells B2 and G2. During rightward motion of the mouse, pair B2 and G2 lags pair A and F by a 90 degree phase shift in the detection of line crossings. During leftward motion, pair B2 and G2 leads pair A and F by 90 degrees. Accordingly, pairs of cells that image areas separated by three-halves of a line width produce a recognizable lead or lag, which enables leftward or rightward motion of the mouse to be determined. Pairs of cells for detecting motion in a particular direction which image areas separated in that particular direction by other odd multiples of half line widths also produce this lead or lag.

Detector cells in the detector array 35 seen in FIG. 3, are substantially square and image square areas on the grid pattern in FIG. 4 which are approximately one-half of a line width on a side. However, compared to the separations between detector cells, the size and shape of detector cells are not particularly critical. An alternate detector 113, seen in FIG. 8, illustrates this point by way of example. Detector cells A, B, F and G detect horizontal motion of a mouse, the same as in FIG. 4. Cells F and G, however, illustrate that detector cells can have any shape in which a width in the particular direction that the cells detect is at most one-half of a line width and in which a length orthogonal to the particular direction that the cells detect is in a range from one-half of a line width to one line width. Detector cell F, for example, has a narrow width, measured in the horizontal direction, of about one-fourth of a line width and a length, measured in the vertical direction, of about one line width. Detector cells A, C, D and E detect vertical motion of a mouse. The length and width of cells C and E are analogous to that of cells F and G. Cell A for detecting both vertical and horizontal motion is constrained by the limit set forth above to be substantially a square with one-half line width sides.

With reference to FIG. 5, optical signals representing differences in reflectivity are picked up by the detector cells and converted into corresponding electrical voltage signals. The electrical outputs from the detector cells are labeled A, B, C, D, E, F and G matching the corresponding cells in FIG. 3 from which they originate, and are transmitted along corresponding lines to circuits where electronic voltage addition or subtraction occurs. For example, cells A and F transmit electrical signals along lines 71 and 72 to adding or subtracting circuit 81. Cells B and G transmit electrical signals along lines 73 and 74 to adding or subtracting circuit 83. Cells A and C transmit electrical signals along lines 75 and 76 to adding or subtracting circuit 85. Cells D and E transmit electrical signals along lines 77 and 78 to adding or subtracting circuit 87. These circuits generate combined output signals along output lines 91, 93, 95 and 97 which represent the sums, denoted by A+F, B+G, A+C and D+E, or differences of each circuit's corresponding input signal.

A differentiating circuit 100 has individual differentiators 101, 103, 105 and 107 connected to respective lines 91, 93, 95 and 97. The output of a differentiator is set to a value of one wherever the voltage of the combined electrical signal A+F, B+G, A+C or D+E being input into the differentiator is decreasing with time, i.e. has a negative time derivative. The output is reset to a value of zero wherever the voltage of the combined electrical signal being input is increasing with time, i.e. has a positive time derivative. The output value remains unchanged when there is no increase or decrease, i.e. whenever the combined signal has a zero time derivative. A constant voltage for hysteresis may be included in the combined signal to prevent random switching of output signal in the case when the combined signal being input has a zero or near zero time derivative. Thus, the differentiating circuit 100 converts the combined electrical signals A+F, B+G, A+C and D+C being input from analog signals, approximating sine waves, to digital square wave signals. Differentiating circuits eliminate the need for a threshold voltage to compensate for the absolute reflectivities of the grid pattern, since it is the change in reflectivity which is represented by the resulting quadrature signal.

The digital square wave signals output by the differentiating circuit 100 are quadrature signals designated XA, XB, YA and YB indicative of line crossings. The quadrature signals are transmitted to the counters 111 which are commercially available and are exemplified by a computer manufactured by LISP Machine, Inc. of Cambridge, Mass., or computers manufactured by Xerox Corporation and BBN of Cambridge, from many mechanical mice and the present code is identical to that produced by such mice. The output from the counter 111 is then fed to a cursor which is displayed on a video display or video terminal.

In FIG. 6, combined signal A+F varies in voltage with time between a minimum voltage Vmin and a maximum voltage Vmax as a mouse moves over a surface with the grid pattern in FIG. 4. The actual values of Vmin and Vmax depend on the absolute reflectivities of the lines and spaces, but are not critical since the detector system relies on the change in these voltage values rather than their actual values to determine the amount and direction of mouse movement. Combined signal B+G is similarly varied. In the present embodiment, the signal A+F is at a maximum voltage whenever both detectors A and F, seen in FIG. 3, are in position to receive reflected light from a grid line, and is at a minimum voltage whenever one of the two detectors is in position to receive light from a low reflectivity space. The signal will be between the maximum and minimum voltage while one of the detectors crosses over a boundary between space and grid line. If, on the other hand, the grid lines have low reflectivity and the spaces have high reflectivity the role of the maximum and minimum voltages will be reversed as will the zero and one states for signals XA and XB. However, the interpretation of signals XA and XB will be unaffected since the order in which signals XA and XB switch states at a line crossing will remain unchanged.

Quadrature signal XA corresponds to combined signal A+F and assumes a one state whenever combined signal A+F is decreasing in voltage with time, i.e. whenever the mouse moves horizontally from a grid line to a space, and assumes a zero state whenever the combined signal is increasing in voltage with time, i.e. whenever the mouse moves horizontally from a space to a grid line. Likewise quadrature signal XB corresponds to combined signal B+G. Quadrature signal YA corresponds to combined signal A+C. Quadrature signal YB corresponds to combined signal D+E.

In FIG. 6, the mouse is moving to the right, as far as its horizontal motion is concerned, up until time $t_2$. The mouse has no horizontal motion between time $t_2$ and time $t_3$. The mouse has a leftward horizontal motion after time $t_3$. Since the pair of detector cells A and F, seen in FIG. 3, image areas located one-half of a line width horizontally from the areas imaged by related pair of detector cells B and G, the combined signals A+F and B+G and consequently the corresponding quadrature signals XA and XB do not switch states simultaneously. At time $t_0$, prior to time $t_2$ signal XB switches to a one state. At a later time $t_1$ also prior to time $t_2$, signal XA switches to the one state. Thus, the signal XB leads the signal XA, thereby indicating rightward horizontal motion of the mouse relative to the surface. At time $t_4$ after time $t_3$, signal XA switches to the one state. At later time $t_5$, signal XB switched to the one state. Thus, signal XB lags the signal XA, thereby indicating leftward horizontal motion of the mouse. Just prior to time $t_2$, signal XB switches to a zero state. At time $t_3$ signal XB switches back to a one state without any intervening switch in signal XA.

FIG. 6 was described in terms of quadrature signals XA and XB and left and right horizontal motions. It will be easily recognized that quadrature signals YA and YB are interpreted in a similar manner to determine up and down vertical motions. Further, it will be recognized that where pairs of detectors are separated from related pairs by three-halves of a line width instead of one-half line width or in other situations the motion convention may be reversed. That is, signal XB leading signal XA will indicate leftward horizontal motion of the mouse, and signal XB lagging signal XA will indicate rightward horizontal motion. Similarly, the vertical motion convention may be reversed.

The present invention provides a compact optical mouse due to the use of a three-by-three detector array. Since one detector cell in each pair of cells crosses grid lines during motion of the mouse over the grid, the system reliably determines relative motion between the mouse and the grid regardless of their relative positions. Further, because the quadrature signals derived by the system are based on differentiation with respect to time of the combined detector signals instead of the values of the detector signals themselves, the system is more strongly independent of the actual reflectivity of the grid lines and spaces than prior systems.

Figure 10:
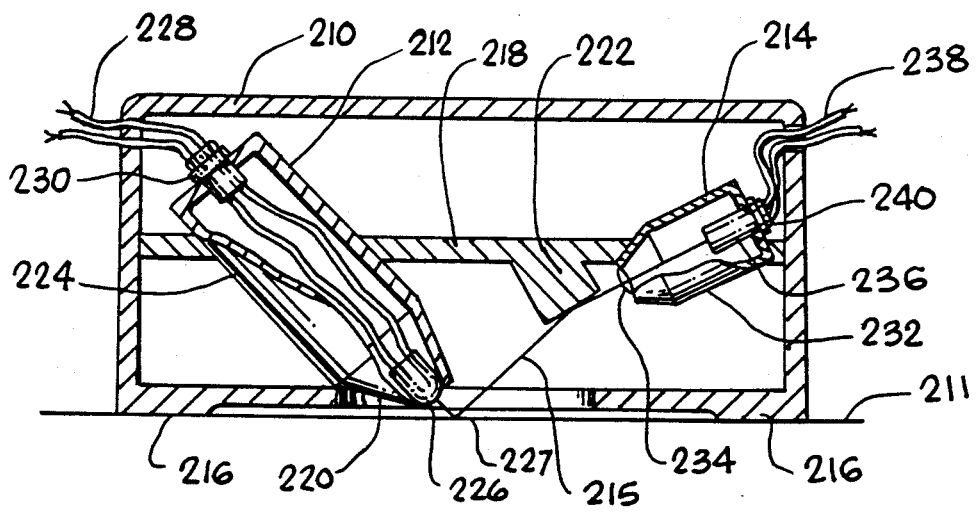
FIG. 10 is a side view of the apparatus shown in FIG. 9.

An improved embodiment of the present invention is shown in FIGS. 9 and 10, in which an optical mouse 208, including a housing 210, a light source 212 and a photodetector 214 is depicted over a grid pattern 211 of horizontal and vertical lines and spaces. Housing 210 may be gripped by the human hand and readily moved in any direction over the surface of the grid pattern 211, shown in greater detail by grid pattern 211a. Housing 210 has low friction feet or spacers 216 which contact the surface of grid pattern 211 and elevate the body of the housing 210 a slight distance above the surface of grid pattern 211. Spacers 216 may be made or treated with any of a number of low friction substances, such as nylon of teflon, so that housing 210 slides easily over the surface of grid pattern 211.

Support platform 218 is affixed to the inner walls of housing 210 so as to position light source 212 and photodetector 214 above the surface of grid pattern 211. Light source 212 and photodetector 214 are disposed within housing 210 and integrally mounted to support platform 218. Light 215, emitted by light source 212, is passed through view hole 220, reflected off of the surface of grid pattern 211 to diffraction mirror 222 and thereby directed to photodetector 214.

Diffraction mirror 222 is not necessarily required for a functional optical mouse 208, but is useful in the improved embodiment because it allows the internal components of the optical mouse 208 to be arranged in a number of different configurations. Light source 212 may be a light emitting diode 226, or LED, incandescent bulb or other broadband illumination source and may emit ultraviolet and infrared light, as well as, visible light. Alternatively, light source 212 may be a laser, such as a diode laser.

LED 226 is mounted within a light tight tube 224 of light source 212, which is aimed downwardly at a spot 227 on the surface of grid pattern 211. LED 226 is preferably mounted close to the surface of grid pattern 211 so that light arriving at the surface will be directed to a relatively narrow spot, such as spot 227, having a diameter sufficient to illuminate the area to be viewed by photodetector 214. Electrically conductive wires 228 are connected to LED 226 and extend through connector 230, which holds the wires 228 in place and prevents damage to the wires 228 when the optical mouse 208 is moved.

Light 215 is directed by diffraction mirror 222 to photodetector 214. Photodetector 214 is housed within a light tight tube 232 of photodetector 214, which is angularly disposed and supported by support platform 218. Light 215 entering photodetector 214 is directed through focusing lens 234, located at the forward end of detector tube 232, to a detector 236. Focusing lens 234 is capable of narrowing or expanding the diameter of the beam of light 215 in accordance with the size of detector 236. Although the preferred embodiment of the detector is a four-by-four array of elements, as shown below, the detector array and its elements can be of any of a number of shapes, sizes, and configurations in relation to the grid pattern as long as the general principles illustrated herein are followed.

Typically, the diameter of spot 227 is about 1.0 mm, which is sufficient to cover an area a little over one grid period square. However, detector 236 can be much bigger or smaller in relation to the spot 227, as long as focusing lens 234 narrows or expands the beam of light 215 accordingly.

Electrically conductive wires 238 are attached to detector 236 and extended through connector 240, which affixes detector 236 to detector tube 232 at the rear end thereof. Focusing lens 234 is typically spaced more than one focal length from the surface of grid pattern 211. The spacing between the optically detective portion of detector 236 and focusing lens 234 is about five focal lengths. The magnification that results should be such that the area being looked at by detector 236 is imaged onto the detector with sufficient magnification. Generally, sufficient magnification means that the magnification should be as low as possible so as to reduce optical errors. The diameter of focusing lens 234 is approximately 3 to 8 mm, but could be more or less. If the light source 212 is sufficiently close to the surface, or is a laser, so that focusing lens 234 does not detect light directly from light source 212, detector tube 232 becomes unnecessary and may be omitted.

In FIG. 9, a partial grid pattern 211a may be seen on the surface of grid pattern 211. Dark orthogonal lines indicate grid lines and white spaces between grid lines indicate spaces between grid lines. Preferably, the entire surface of grid pattern 211 would be covered with the repetitive pattern of grid pattern 211. Although there is typically a high degree of optical contrast between the grid lines and spaces, or optically absorptive and reflective portions, the contrast need only be large enough to allow detector 236 to distinguish lines from spaces.

If optical mouse 208 is to be used on a visually translucent grid pattern 211, it is desirable to make light source 212 a nonvisual light source and photodetector 214 receptive to that nonvisual source. In such a situation, it may be possible to treat or imprint the lines of the grid pattern 211 with a substance that reflects the nonvisual light and absorbs the visual light, or vice versa. Thus, optical mouse 208 would see a grid on grid pattern 211, but the grid itself would be visually translucent. The term "visually translucent" means that a pattern lying underneath the surface of the grid pattern would be discernable to the human eye in varying degrees of clarity from clear to hazy. Grid lines or spaces, depending upon which is selected to reflect light to the detector, could be created by imprinting fine dots or lines. Alternatively, the spaces, could be printed or dyed on the surface of grid pattern 211 with any of a number of substances having the desired optical properties, such as the coating materials used to form certain types of sun glass lenses.

There is no particular starting point for the optical mouse 208 on the surface of grid pattern 211, thus, it may be brought down anywhere on the surface. When placing the mouse on the surface, alignment should be such that detector 236 is appropriately oriented with respect to the grid pattern 211, such as is shown in FIG. 9. However, optical mouse 208 may be rotated up to a maximum number of degrees, such as 30 degrees, in either direction from this nominal orientation without affecting the decoded signal produced by optical mouse 208.

Figure 11:
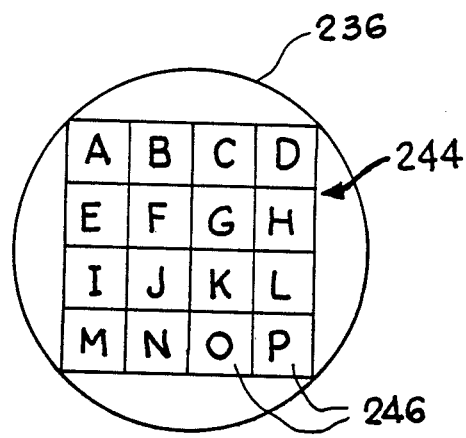
FIG. 11 is plan view of the detector array for use in the optical mouse of FIGS. 9 and 10.

FIG. 11 depicts the optical detection area of detector 236 used in the optical mouse 208 of FIGS. 9 and 10. The position control system of the present invention, which includes optical mouse 208 and grid pattern 211, is operative to generate an electrical signal which instructs a cursor, or the memory locator of a computer, concerning the movement of the optical mouse 208 over the grid pattern 211.

In FIG. 11, the optically active area of detector 236 is represented by the square detector array 244, a four-by-four array of detector elements 246. The detector array 244 may be comprised of transistors or diodes in a CCD array. Detector elements 246 are designated with the letters A through P. Four of the sixteen detector elements 246 are inactive and are designated by the letters F, H, N and P. Elements A, C, E, G, I, K, M and O are used to detect vertical motion and elements A, B, C, D, I, J, K, and L are used to detect horizontal motion. The manner in which vertical or horizontal motion is detected is discussed below with reference to FIGS. 12-13b.

Figure 12:
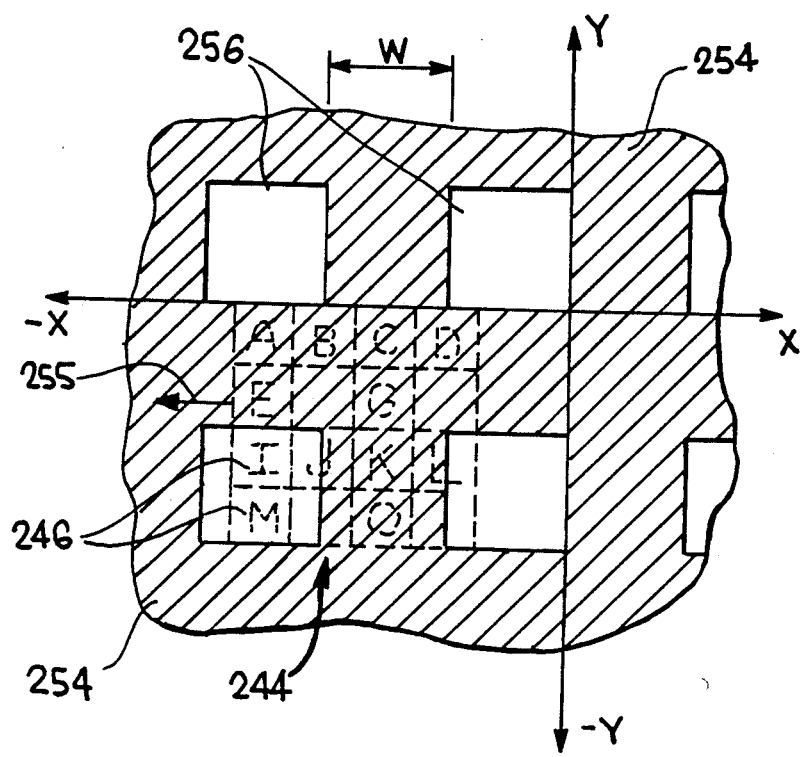
FIG. 12 is a plan view of a portion of a grid pattern for use with the optical mouse of FIGS. 9 and 10 and indicating the relative size of the area observed by the detector array of FIG. 11 in relation to the grid pattern.

FIG. 12 depicts a portion of a grid pattern 211 and indicates the relative size of the area observed by the detector array 244 in relation to the grid pattern 211. Grid pattern 211 is made up of two intersecting orthogonal sets of grid lines 254, which form grid spaces 256 therebetween. Grid lines 254 and grid spaces 256 have differing degrees of reflectivity. The difference between the two degrees of reflectivity should be sufficient to allow detector 236 to distinguish grid lines 254 from grid spaces 256. The boundaries 257 between grid lines 254 and grid space 256 need not be sharply defined, although this is preferred, provided sufficient contrast ratio exists between lines and spaces so as to be detectable.

Typically, the grid lines 254 have approximately the same line width, W, as the length or width of each grid space 256. There are approximately 50 grid lines 254 per square inch of grid pattern 211. At 50 grid lines/inch, W is about 0.5 mm, making each grid space about 0.5 mm/side. 1.0 mm or other line widths may also be used. The grid pattern 211a need not form square spaces, although this is typically easier to handle for computer purposes.

In FIG. 12, the detector array 244 is depicted by dashed lines, which indicate the relative area imaged by detector array 244, as well as a typical view and orientation of detector 236 relative to grid lines 254 and spaces 256, and in particular to the line width. Since the grid lines are orthogonal, as indicated in FIG. 12 by the x-y coordinate axes, horizontal motion in the x-direction and vertical motion in the y-direction can be detected and measured independently. Although the optical mouse 208 can be moved in any direction relative to grid pattern 211, arrow 255 shows the movement of the detector array 244 along the x-axis, from positive x-axis coordinates to negative x-axis coordinates, for subsequent descriptive purposes. If the housing 210 is rotated more than a certain amount, such as 45 degrees, the axes switch and the x-axis becomes the y-axis and visa versa.

If detector array 244, as shown in FIG. 12, is oriented in the same fashion as detector array 244 in FIG. 11, vertical motion would be detected by detector elements 246 lettered A, C, E, G, I, K, M and O and horizontal motion would be detected by detector elements lettered A, B, C, D, I, J, K and L. Each detector element 246 produces an electrical signal proportional to the amount of light it detects while in any particular position. By electronically summing the output signals of two detector elements detecting motion along the same axis, a paired electrical signal proportional to the sum of the electrical signals of the two detector elements 246 can be produced. A similar differential paired output signal can be derived by subtracting the two output signals.

Pairs of detector elements 246 are located so as to image areas one line width horizontally apart for detector elements 246 detecting vertical motion, and one line width vertically apart for detector elements 246 detecting horizontal motion. Vertical detector element pairs are A+C, E+G, I+K, and M+O. Horizontal detector element pairs are A+I, B+J, C+K, and D+L. Each detector element pair corresponds to one phase of one of the two quadrature signals utilized to determine motion and direction along a particular axis.

Arranging the detector element pairs in such a fashion assures that at least one element of the pair of elements detecting motion along a particular axis will be positioned to detect crossings between grid lines and spaces. In addition, such an arrangement assure that one of the two resulting quadrature signals will lead the other signal in time, depending upon the direction of motion, as will be further explained below. Other element pair spacing configurations can be utilized as long one element out of a pair of elements corresponding to one quadrature signal sees the opposite grid pattern as an element in the other pair corresponding to the quadrature signal, and there is a determinable lead or lag in time between the two quadrature signals indicating the motion of the mouse in a particular direction.

Figure 13:
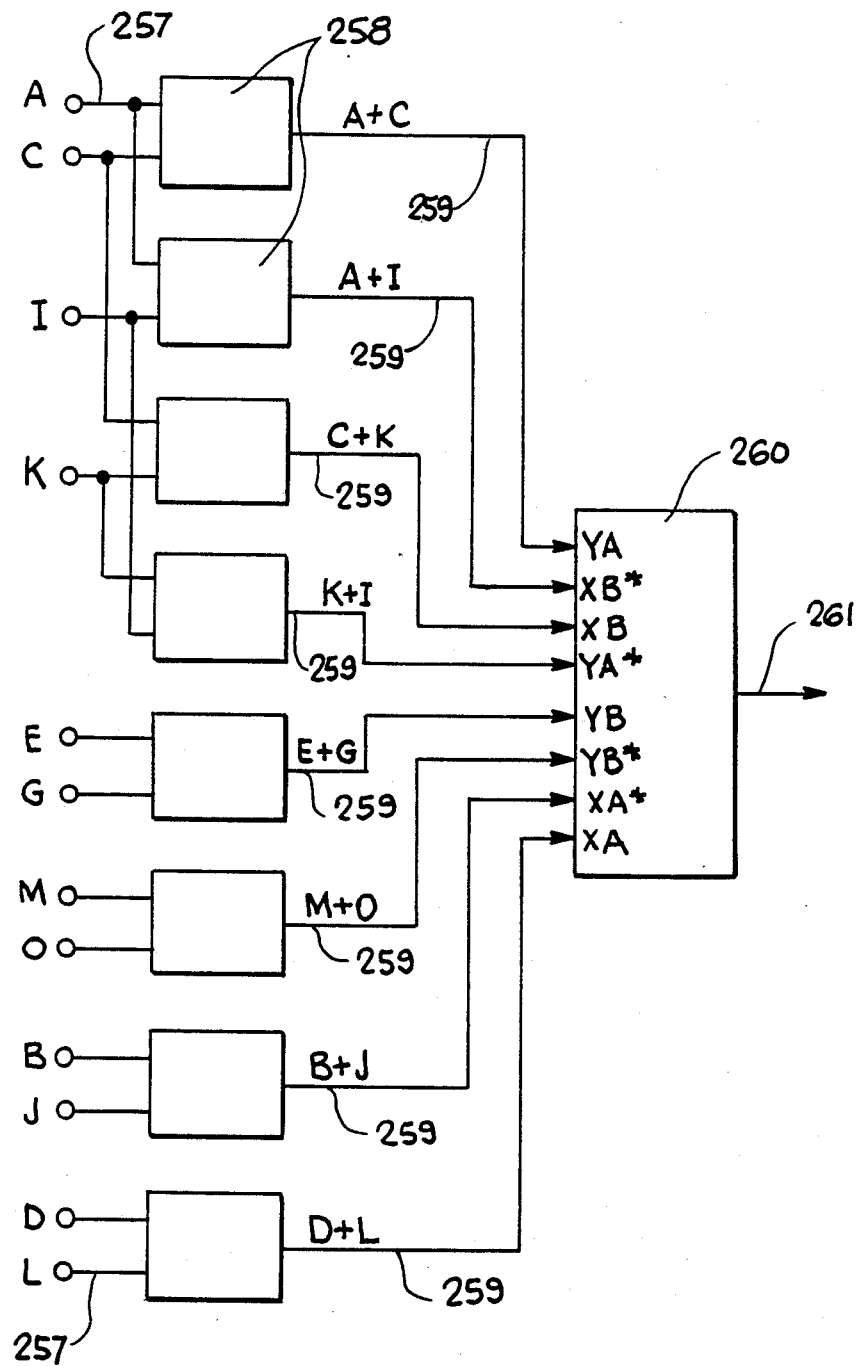
FIG. 13 is block diagram schematically illustrating an electronic circuit used with the detector array of FIG. 11.

An electronic circuit, or system processor, operative to receive the detector element output signals and produce an electrical signal capable of instructing a cursor, or the memory locator of a computer, with regard to the movement of the optical mouse 208 over the grid pattern 211, is depicted in FIG. 13. As previously stated, each detector element 246 produces an electrical signal 257 proportional to the light detected by the detector elements 246. By inputting the detector element output signals 257 to at least one of a number of summation circuits 258, the vertical and horizontal detector element pairs described above can be created.

Output signals 257, corresponding to detector elements A, C, I and K are each input to two separate summation circuits 258, while all other detector element output signals 257 are input to a single summation circuit 258. Processor/counter 260, is responsive to paired output signals 259 and operative to process those signals in order to determine the motion and direction of the optical mouse 208 over the grid pattern 211 and to produce the system output signal 261. System output signal 261 can be used to control the movement of a cursor over a terminal screen or to provide location and data information to a system memory. Each paired output signal 259 represents one phase of the two quadrature signals corresponding to either the x or y-axis.

For each axis, there are A and A* signals and B and B* signals. The A and B signals represent one phase of the quadrature signals XA and XB, and A* and B* represent the other phase of the quadrature signals XA and XB. The "*" indicates that the A* and B* signals are 180 degrees out-of-phase with the A and B signals. There are YA, YA* and YB, YB* signals for the y-axis, and XA, XA*, and XB, XB* for the x-axis. The quadrature signals can be better understood with reference to FIG. 13a below.

Figure 13A:
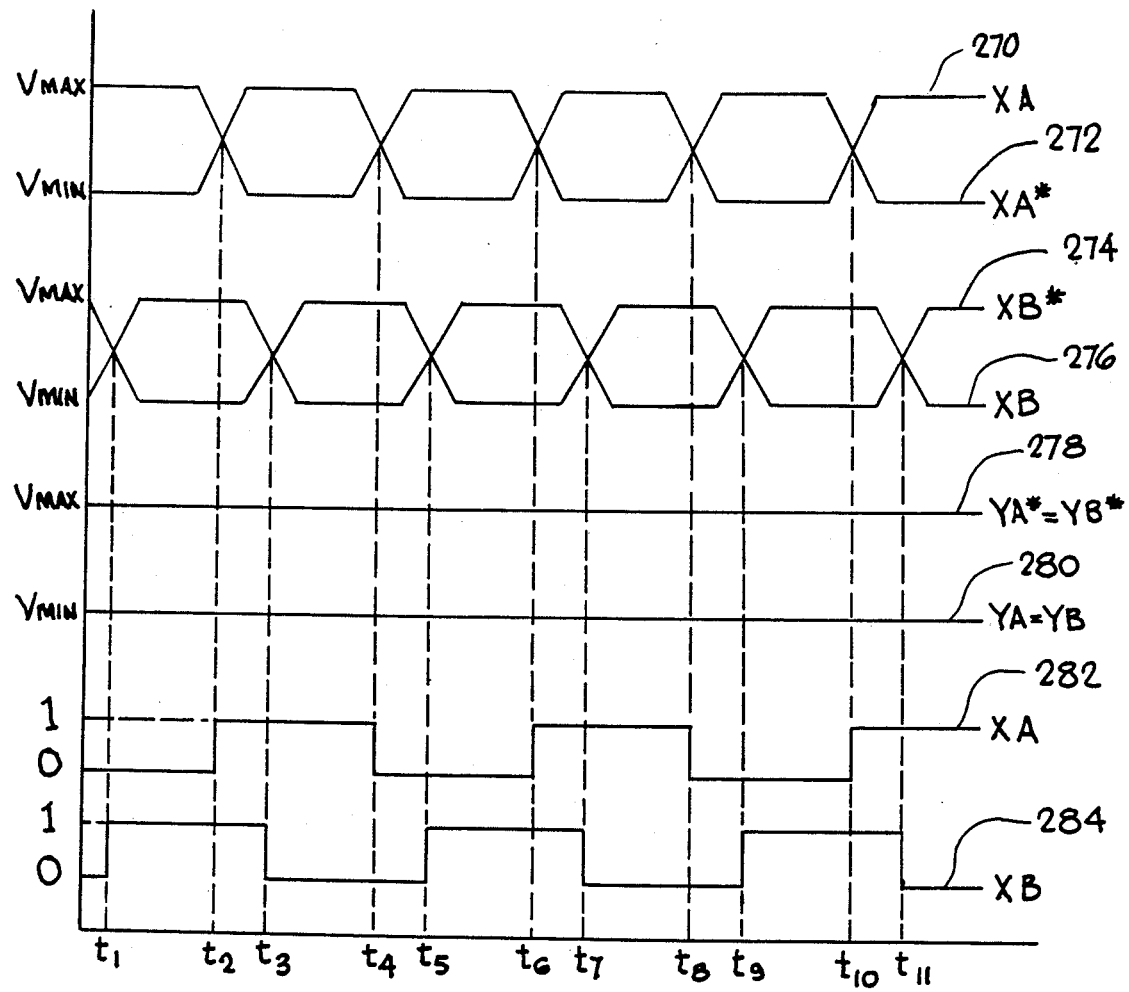
FIG. 13a is a timing diagram representation of the detector element output signal for the detector array of FIG. 13, and corresponding paired output signals, each indicative of one phase of the quadrature signals which represent the amount and direction of movement of the detector array along a particular orthogonal coordinate axis.

FIG. 13a is a timing diagram representation of the detector element output signals for the detector array of FIG. 13, and corresponding paired output signals, each indicative of one phase of the quadrature signals, which represent the amount and direction of movement of the optical mouse 208 along a particular orthogonal coordinate axis. Paired output signal XA varies in voltage with time between a minimum voltage Vmin and a maximum voltage Vmax as optical mouse 208 moves over the surface of grid pattern 211 as shown above in FIG. 12 by arrow 255. Paired output signal XA corresponds to the summation of detector element output signals from detector elements D and L. As the pair of detector elements D+L moves across grid pattern 211, detector element D remains within grid line 254 and collects only a minimal amount of light. At the same time, detector element L is passing from grid line 254 to grid space 256 and collecting varying amounts of light, which corresponds to varying voltage levels in the output signal of the detector element. Because only the equivalent of one detector element of a pair of detector elements can be within a grid space at any one time, the maximum voltage level of the paired output signal of any pair of detector elements should not exceed the voltage level of the output signal of a single detector element completely within a grid space, such as detector elements I and M as shown in FIG. 12.

For the detector array 244 moving across the surface of the grid pattern 211 as shown in FIG. 12, the resulting paired output signals would appear as shown by the signals 270–280 depicted in FIG. 13a. The actual values of Vmin and Vmax depend on the absolute reflectivity of the grid lines and space, but are not critical since the detector system relies on the change in the voltage values rather than their actual values to determine the amount and direction of optical mouse 208 movement. Signals 272 and 274 appear to represent mirror images of signals 270 and 276 because the former signals correspond to the output signals of detector element pairs which are 180 degrees out-of-phase with the latter signals.

By comparing signal 270 to signal 272, it is possible to determine when a line crossing has occurred because the voltage levels of the signals will begin to switch and at some point the signals will cross. Signal crossing points at times $t_2$, $t_4$, $t_6$, $t_8$, and $t_{10}$ of the two paired output signals XA and XA* indicate state changes and are used to create the quadrature signal XA′, represented by line 282. Likewise, signal crossing points at times $t_1$, $t_3$, $t_5$, $t_7$, and $t_9$ of the two paired output signals XB and XB* indicate state changes and are used to create the quadrature signal XB′, represented by line 284.

The initial binary states of signals XA′ and XB′ can be either 0 or 1, provided the binary states alternate accordingly every time a binary state change is detected. It should be noted that signals 278 and 280, representing YA*=YB* and YA=YB respectively, are maintained at either Vmax or Vmin for detector array 244 movement as shown in FIG. 12 because regardless of the motion of the detector array the amount of light detected by the corresponding detector elements does not vary. Using the crossing points between the signals representing the two phases of the quadrature signal to determine when a binary state change has occurred is more effective and reliable than attempting to determine whether the paired output signals are rising or falling with a differentiating circuit.

By comparing quadrature signal XA′ to XB′ it is possible to determine the direction of movement of detector array 244. In FIG. 13a, signal XB′ leads signal XA′ in time, thus the detector elements corresponding to signal XB′ are detecting grid line or space crossings before the detector elements corresponding to signal XA′ detect the same grid lines or spaces. Signal XB*, which corresponds to the paired output signal of detector element pair A+I, is at the leading portion of the detector array 244 and is thereby first to vary in voltage as a grid line or space is encountered. Signal XA*, which corresponds to the paired output signal of detector element pair B+J, is the second detector element pair of the x-axis detectors to vary in voltage and lags signal XB* by 90 degrees. If the detector array 244 was moving in the opposite direction, signal XA* would lead signal XB*, and rightward motion would be detected.

Figure 13B:
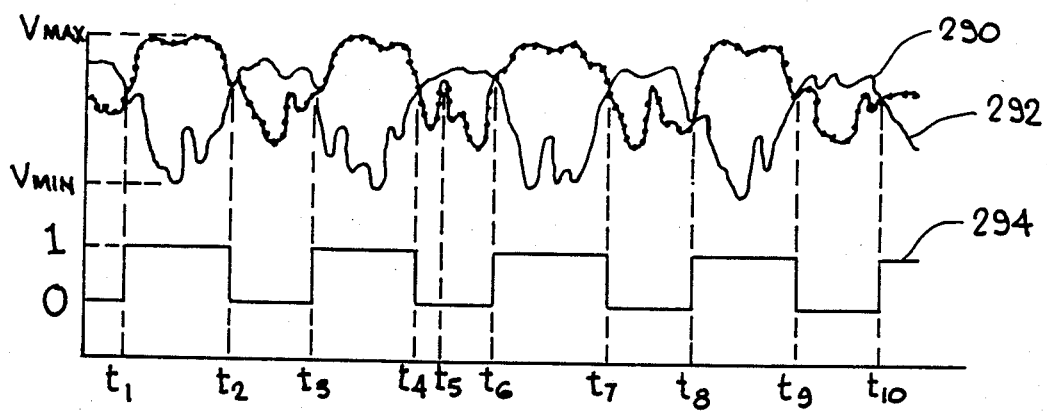
FIG. 13b is a timing diagram representation of detector element output signals and corresponding paired output signals for two pairs of detector elements of the detector array of FIG. 13.

The detector array 244 will rarely, if ever, move as shown in FIG. 12 because with a human hand usually being responsible for its movement, the signals 270–280 would rarely be as uniform as depicted in FIG. 13a. A more typical representation of the signals XA* and XA are shown in FIG. 13b by the lines 290 and 292. Line 290 is dotted to distinguish it from line 292. By comparing lines 290 and 292, quadrature signal XA′, shown by line 294, can be derived representing the appropriate binary state changes. Because only signal crossings are used to determine binary state changes it is unnecessary to determine the rise and fall time of the signals XA* and XA, which would be difficult due to the extreme variations in the signals. For instance, times $t_1$, $t_2$, $t_3$, $t_4$, $t_6$, $t_7$, $t_8$, $t_9$ and $t_{10}$ represent legitimate signal crossings and therefore represent legitimate binary state changes. However, time $t_5$ represents a significant change in the voltage level of signal XA*, and might be interpreted as a state change by a system utilizing differentiating circuits to determine binary state changes, thereby resulting in a false line crossing. In the system of the improved embodiment of the present invention, time $t_5$ does not indicate a state change because no signal crossing has occurred, thus no false line crossing will be created by the system.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An improved optical position detector system comprising,
    means forming a surface having a grid pattern thereon with two sets of intersecting orthogonal grid lines, said grid lines having a predetermined width and a first reflectivity and defining spaces therebetween of a second contrasting reflectivity;
    an optical mouse movable over said surface, and including means for illuminating a portion of said grid pattern on said surface, and
    an array of detector elements disposed for imaging areas of said illuminated portion, each of said elements being operative to generate an electrical signal proportional to the quantity of light received from said illuminated portion, said array including at least four pairs of elements for detecting motion of said mouse in a particular first direction relative to said surface, two of said pairs forming a first set of pairs and two of said pairs forming a second set of pairs, said elements of each said set being disposed within said array such that when any one element of a pair in a set images a space, the other element of the pair images a line, and movement of said mouse in said first direction over a distance of at least said line width causes a change in the voltage level of the electrical signal generated by one element in said first set which is approximately 180 degrees out-of-phase with the change in the voltage level of the electrical signal generated by another element in said first set, and a change in the voltage level of the electrical signal generated by one element in said second set which is approximately 180 degrees out-of-phase with the change in the voltage level of the electrical signal generated by another element in said second set, and such that the electrical signal generated by said one element in said first set either lags in time or leads in time the electrical signal generated by said one element in said second set; and
    system processor means operative to receive said electrical signal from each of said elements and to determine an amount and direction of movement of said mouse in said first direction.

2. The improved detector system of claim 1 wherein said system processor means comprises:
    combining means operative to receive said electrical signals from said elements and to combine the electrical signals from each said pair to form paired electrical signals corresponding to the combined output of each said pair; and
    means operative to receive said paired electrical signals, to compare said paired electrical signals corresponding to said first set to produce a corresponding first quadrature signal, to compare said paired electrical signals corresponding to said second set to produce a corresponding second quadrature signal, each said quadrature signal being in a first state prior to a first movement of said mouse, said first quadrature signal switching to a second state the first time said electrical signals corresponding to said first set have equal voltage levels at the same point in time, said second quadrature signal switching to a second state the first time said electrical signals corresponding to said second set have equal voltage levels at the same point in time, said first and second quadrature signals thereafter alternating between said first state and said second state each time said electrical signals corresponding to said first set and said second set have equal voltage levels at the same point in time respectively, and to determine a lead in one of said quadrature signals relative to the other quadrature signal.

3. The improved detector system of claim 1 wherein said grid lines are highly reflective and spaces are highly absorptive.

4. The improved detector system of claim 1 wherein said grid lines are highly absorptive and spaces are highly reflective.

5. The improved detector system of claim 1 wherein each set of orthogonal grid lines is uniformly spaced one line width apart.

6. The improved detector system of claim 1 wherein said spaces have a characteristic dimension which is substantially equal to said line width.

7. The improved detector system of claim 1 wherein said grid pattern is visually translucent.

8. The improved detector system of claim 1 wherein said optical mouse further includes means for directing light reflected from said illuminated portion to said array.

9. The improved detector system of claim 1 wherein said illuminating means is selected from the group consisting of an LED, an incandescent bulb, an infrared light source, an ultraviolet light source and a laser.

10. The improved detector system of claim 1 wherein each of said elements in a pair detecting motion of said mouse in a particular direction images an area on said surface with a width in said particular direction of at most one-half of a line width and with a length orthogonal to said particular direction in a range from one-half of a line width to one line width.

11. The improved detector system of claim 1, wherein said array further includes
at least four pairs of elements for detecting motion of said mouse in a particular second direction orthogonal to said first direction, two of said pairs forming a third set of pairs and two of said pairs forming a fourth set of pairs, said elements of each said set being disposed within said array such that
when any one element of a pair in a set images a space, the other element of the pair images a line, and
movement of said mouse in said second direction over a distance of at least said line width causes a change in the voltage level of the electrical signal generated by one element in said third set which is approximately 180 degrees out-of-phase with the change in the voltage level of the electrical signal generated by another element in said third set, and a change in the voltage level of the electrical signal generated by one element in said fourth set which is approximately 180 degrees out-of-phase with the change in the voltage level of the electrical signal generated by another element in said fourth set, and such that
the electrical signal generated by said one element in said third set either lags in time or leads in time the electrical signal generated by said one element in said fourth set, and
wherein said system processor means is further operative to receive said electrical signal from each of said elements and to determine an amount and direction of movement of said mouse in said second direction.

12. The improved detector system of claim 11 wherein said system processor means comprises:
combining means operative to receive said electrical signals from said elements and to combine said electrical signals from each said pair to form paired electrical signals corresponding to the combined output of each said pair; and
means operative to receive said paired electrical signals, to compare said paired electrical signals corresponding to said first set to produce a corresponding first quadrature signal, to compare said paired electrical signals corresponding to said second set to produce a corresponding second quadrature signal, to compare said paired electrical signals corresponding to said third set to produce a corresponding third quadrature signal, to compare said paired electrical signals corresponding to said fourth set to produce a corresponding fourth quadrature signal, each said quadrature signal being in a first state prior to a first movement of said mouse, said first quadrature signal switching to a second state the first time said electrical signals corresponding to said first set have equal voltage levels at the same point in time, said second quadrature signal switching to a second state the first time said electrical signals corresponding to said second set have equal voltage levels at the same point in time, said third quadrature signal switching to a second state the first time said electrical signals corresponding to said third set have equal voltage levels at the same point in time, said fourth quadrature signal switching to a second state the first time said electrical signals corresponding to said fourth set have equal voltage levels at the same point in time, said first, second, third and fourth quadrature signals thereafter alternating between said first state and said second state each time said electrical signals corresponding to said first set, said second set, said third set, and said fourth set have equal voltage levels at the same point in time respectively, to determine a lead between said first quadrature signal and said second quadrature signal, and to determine a lead between said third quadrature signal and said fourth quadrature signal.

13. The improved detector system of claim 11 wherein said grid lines are highly reflective and spaces are highly absorptive.

14. The improved detector system of claim 11 wherein said grid lines are highly absorptive and spaces are highly reflective.

15. The improved detector system of claim 11 wherein each set of orthogonal grid lines is uniformly spaced one line width apart.

16. The improved detector system of claim 11 wherein said spaces have a characteristic dimension which is substantially equal to said line width.

17. The improved detector system of claim 11 wherein said grid pattern is visually translucent.

18. The improved detector system of claim 11 wherein said optical mouse further includes means for directing light reflected from said illuminated portion to said array.

19. The improved detector system of claims 11 wherein said array includes twelve of said elements grouped into pairs of elements, four of said twelve elements each being common to two of said pairs.

20. The improved detector system of claim 11 wherein said illuminating means is selected from the group consisting of an LED, an incandescent bulb, an infrared light source, an ultraviolet light source, a flourescent light source and a laser.

21. The improved detector system of claim 11 wherein each of said elements in a pair detecting motion of said mouse in a particular direction images an area on said surface with a width in said particular direction of at most one-half of a line width and with a length orthogonal to said particular direction in a range from one-half of a line width to one line width.

22. The improved detector system of claim 11 wherein said array is a four-by-four array of elements laid out in the following pattern:

| A | B | C | D |
|---|---|---|---|
| E | X | G | X |
| I | J | K | L |
| M | X | O | X | where elements A-E, G, I-M and O are active and elements X are inactive.

23. The improved detector system of claim 22 wherein the electrical signals from said array are logically combined as follows: D+L, B+J, C+K, A+I, A+C, K+I, E+G, M+O, respectively yielding paired electrical signals XA, XA*, XB, XB*, YA, YA*, YB, YB*, and wherein said paired electrical signals are compared as follows: XA and XA*, XB and XB*, YA and YA*, YB and YB*, respectively to produce quadrature signals XA', XB', YA' and YB'.

* * * * *